United States Patent
Speith-Herfurth et al.

(10) Patent No.: US 6,777,067 B1
(45) Date of Patent: Aug. 17, 2004

(54) HEAT SEALABLE, BIAXALLY ORIENTED POLYPROPYLENE FILM WITH IMPROVED BARRIER PROPERTIES

(75) Inventors: Angela Speith-Herfurth, Egelsbach (DE); Robert Hansohn, Kirkel (DE); Detlef Schumann, Spieson-Elversburg (DE); Frank Ernst, Zacapu (DE)

(73) Assignee: Hoechst Trespaphan GmbH (DE)

( * ) Notice: Subject to any disclaimer, the term of this patent is extended or adjusted under 35 U.S.C. 154(b) by 0 days.

(21) Appl. No.: 09/601,790
(22) PCT Filed: Feb. 10, 1999
(86) PCT No.: PCT/EP99/00847

§ 371 (c)(1),
(2), (4) Date: Sep. 5, 2000

(87) PCT Pub. No.: WO99/41300
PCT Pub. Date: Aug. 19, 1999

(30) Foreign Application Priority Data

Feb. 12, 1998 (DE) .......................................... 198 05 640
Aug. 8, 1998 (DE) .......................................... 198 35 953

(51) Int. Cl.[7] ............................................. B32B 27/06
(52) U.S. Cl. .................... 428/220; 428/349; 428/484.1; 428/515; 428/516; 428/910
(58) Field of Search ............................ 428/220, 484.1, 428/349, 515, 516, 910, 215, 484

(56) References Cited

U.S. PATENT DOCUMENTS

| | | | |
|---|---|---|---|
| 4,692,386 A | 9/1987 | Schinkel et al. ............ | 428/515 |
| 4,921,749 A | 5/1990 | Bossaert et al. ............ | 428/216 |
| 5,155,160 A | 10/1992 | Yeh et al. .................... | 524/487 |
| 5,246,769 A * | 9/1993 | Murschall et al. .......... | 428/216 |
| 5,254,394 A * | 10/1993 | Bothe et al. ................. | 428/212 |
| 5,667,902 A * | 9/1997 | Brew et al. ................. | 428/518 |
| 6,068,936 A * | 5/2000 | Peiffer et al. ............... | 428/500 |
| 6,159,612 A * | 12/2000 | Chu et al. ................... | 428/484 |
| 6,312,825 B1 * | 11/2001 | Su et al. ..................... | 428/484 |

FOREIGN PATENT DOCUMENTS

| | | |
|---|---|---|
| EP | 0441027 | 8/1991 |
| EP | 0645417 | 9/1994 |
| WO | WO 96/27491 | 9/1996 |
| WO | WO 97/46369 | 12/1997 |

\* cited by examiner

*Primary Examiner*—Monique R. Jackson
(74) *Attorney, Agent, or Firm*—Dickinson Wright PLLC

(57) ABSTRACT

The invention relates to a multi-layer, sealable biaxially oriented polypropylene film consisting of a base layer and at least one sealable covering layer. The base layer contains between 1 and 15 weight % of a resin with a mean molecular weight Mw of between 600 and 1,500 and between 1 and 6 weight % of a wax with a mean molecular weight Mn of between 200 and 700. The n-heptane insoluble part of the polypropylene of the base layer has a chain isotactic index of at least 95%, as measured by $^{13}$C-NMR spectroscopy. The invention also relates to a method for producing said film and to its use.

30 Claims, No Drawings

HEAT SEALABLE, BIAXALLY ORIENTED POLYPROPYLENE FILM WITH IMPROVED BARRIER PROPERTIES

The invention relates to a polypropylene film having improved barrier properties with respect to the passage of water vapor and improved mechanical properties.

The improvement in the mechanical properties of films, in particular of films for the packaging sector, has recently increased in importance. For cost and environmental reasons, the packaging industry desires ever thinner films which still pass through the machine as smoothly and have the same or improved barrier properties, in particular with respect to the passage of water vapor.

However, thinner films have over-proportionately impaired rigidity in the machine direction and consequently significantly worse machine running behavior, in particular in today's high-speed wrapping machines. In addition, the barrier properties likewise worsen over-proportionately with the reduction in film thickness. As a consequence of the poorer barrier properties of thin films, the protective action of the film against drying-out and spoilage of the contents is greatly restricted.

The increase in the modulus of elasticity (E-modulus) in the machine direction has been the subject of intense efforts for some time since this mechanical property is directly related to the technical suitability and thus determines the processing behavior directly.

The barrier action of BOPP films to water vapor (WVBA) and oxygen (OBA) decreases with the film thickness. In the usual thickness range of BOPP films (from 4 to 100 $\mu$m) there is, for example, an approximately hyperbolic relationship between the water vapor barrier (WVBA) and the thickness (d) (WVBA=const.). The constant depends essentially on the raw material composition and the stretching conditions. For BOPP packaging films in accordance with the prior art, the constant has a value of approximately: const.=28 g.$\mu$m/m$^2$.d. The water vapor permeability here has been measured in accordance with DIN 53 122.

It is known that the modulus of elasticity of BOPP films in the machine direction can be increased either via the process technology or via raw material modifications or a combination of the two possibilities.

The modification of polypropylene films with various hydrocarbon resins is known from the prior art. A raw material modification of this type enables the production of polypropylene films whose mechanical strength in the longitudinal direction is significantly improved compared with films made from unmodified raw materials, but does not achieve the values of films which have been subjected to subsequent longitudinal stretching, and whose shrinkage in the longitudinal direction is likewise relatively high.

U.S. Pat. No. 4,921,749 (=EP-A-0 247 898) describes a heat-sealable BOPP film having improved mechanical and optical properties. The heat-sealability of the film and the water vapor and oxygen permeability are likewise improved. All the improvements result from the addition of a low-molecular-weight resin to the base layer. The resin content here is between 3 and 30% by weight. The resin has a molecular weight of significantly less than 5000, preferably less than 1000, and is, for example, 600. The softening point of the resin is from 120 to 140° C.

EP-A-0 645 417 describes a biaxially oriented polypropylene film whose n-heptane-insoluble content has a chain isotacticity index, measured by means of $^{13}$C-NMR spectroscopy, of at least 95%. The base layer contains from 1 to 15% by weight of a natural or synthetic resin which has a softening point of from 70 to 170° C.

U.S. Pat. No. 5,155,160 describes the improvement in the barrier properties by the addition of wax to unoriented polypropylene films. The waxes described are paraffin waxes and polyethylene waxes having a molecular weight of from 300 to 800. The barrier action is said to be less than 0.2 g/100 square inches/24 hours.

There is a continuous demand for a further improvement in the water vapor barrier action of biaxially oriented packaging films made from polypropylene. None of the methods disclosed hitherto reduces the water vapor barrier action to the desired extent and all impair other essential film properties in an unacceptable manner.

The object of the present invention was therefore to provide a biaxially oriented polypropylene film which is distinguished by a good water vapor barrier action and has good mechanical properties. It must be possible to produce the film with reliable running and operation at production speeds of up to 400 m/min. Other physical film properties required in view of their use as packaging film must not be adversely affected. The film should have high gloss, no optical defects in the form of fisheyes or bubbles, good scratch resistance, fault-free running on high-speed packaging machines at low film thickness, and low film haze. In addition, the heat-sealing properties must not be adversely affected.

This object is achieved by a multilayer biaxially oriented polypropylene film comprising a base layer and at least one heat-sealable top layer, wherein the base layer comprises a combination of resin and wax, and the resin has a mean molecular weight Mw of from 600 to 1500, and the wax has a mean molecular weight Mn of from 200 to 700. The sub-claims indicate preferred embodiments of the invention.

The base layer of the film generally comprises at least 85% by weight, preferably from 85 to <100% by weight, in particular from 90 to 95% by weight, in each case based on the base layer, of propylene polymer.

In general, the propylene polymer comprises at least 90% by weight, preferably from 94 to 100% by weight, in particular from 98 to 100% by weight, of propylene. The corresponding comonomer content of at most 10% by weight or from 0 to 6% by weight or from 0 to 2% by weight generally consists, if present, of ethylene. The data in percent by weight in each case relate to the propylene homopolymer.

Preference is given to isotactic propylene homopolymers having a melting point of from 140 to 170° C., preferably from 155 to 165° C., and a melt flow index (measurement DIN 53 735 at a load of 21.6 N and 230° C.) of from 1.0 to 10 g/10 min, preferably from 1.5 to 6.5 g/10 min. The n-heptane-soluble content of the polymer is generally from 1 to 10% by weight, preferably 2–5% by weight, based on the starting polymer.

The molecular weight distribution of the propylene polymer can vary within broad limits, depending on the area of application. The ratio between the weight average molecular weight $M_w$ and the number average molecular weight $M_n$ is generally between 1 and 15.

In a preferred embodiment of the film according to the invention, the ratio between the weight average molecular weight $M_w$ and the number average molecular weight $M_n$ is from 2 to 10, very particularly preferably from 2 to 6. Such a narrow molecular weight distribution of the propylene homopolymer of the base layer is achieved, for example, by peroxidic degradation thereof or by preparing the polypropylene by means of suitable metallocene catalysts.

A measure of the degree of degradation of the polymer is the degradation factor A, which gives the relative change in the melt flow index, measured in accordance with DIN 53 735, of the polypropylene, based on the starting polymer.

$$A = \frac{MFI_2}{MFI_1}$$

$MFI_1$=melt flow index of the propylene polymer before addition of the organic peroxide $MFI_2$=melt flow index of the peroxidically degraded propylene polymer.

In general, the degradation factor A of the propylene polymer employed is in the range from about 1 to 15, preferably from about 1 to 10.

Particularly preferred organic peroxides are dialkyl peroxides, where the term alkyl radical is taken to mean a conventional saturated, straight-chain or branched lower alkyl radical having up to six carbon atoms. Particular preference is given to 2,5-dimethyl-2,5-di(t-butylperoxy) hexane and di-t-butyl peroxide.

In a preferred embodiment of the invention, the polypropylene employed is highly isotactic. For highly isotactic polypropylenes of this type, the chain isotacticity index of the n-heptane-insoluble content of the polypropylene, determined by $^{13}C$-NMR spectroscopy, is at least 95%, preferably from 96 to 99%.

It has now been found that the selection of a highly isotactic polypropylene of this type additionally interacts with the resin/wax combination according to the invention in a surprisingly favorable manner to give an improvement and further improves the water vapor barrier action.

It is essential to the invention that the base layer comprises a hydrocarbon resin having a mean molecular weight Mw (weight average) of from 600 to 1500, preferably from 700 to 1200, preferably in an amount of from 1 to 15% by weight, in particular from 5 to 12% by weight, based on the weight of the base layer.

Suitable hydrocarbon resins are basically synthetic resins or resins of natural origin, which are generally partially or fully hydrogenated. The softening point of the resins is generally above 80° C. (measured in accordance with DIN 1995-U4 or ASTM E-28), preference being given to resins having a softening point of from 100 to 180° C., in particular from 120 to 160°C.

For the purposes of the present invention, hydrocarbon resins cover, for example, petroleum resins, styrene resins, cyclopentadiene resins and terpene resins (these resins are described in Ullmanns Encyklopädie der techn. Chemie [Ullmann's Encyclopaedia of Industrial Chemistry], $4_{th}$ Edition, Volume 12, pages 525 to 555).

The petroleum resins are hydrocarbon resins prepared by polymerization of deep-decomposed petroleum materials in the presence of a catalyst. These petroleum materials usually comprise a mixture of resin-forming substances, such as styrene, methylstyrene, vinyltoluene, indene, methylindene, butadiene, isoprene, piperylene and pentylene. The styrene resins are homopolymers of styrene or copolymers of styrene with other monomers, such as methylstyrene, vinyltoluene or butadiene. The cyclo-pentadiene resins are cyclopentadiene homopolymers or cyclopentadiene copolymers obtained from coal tar distillates and fractionated petroleum gas. These resins are prepared by keeping the materials containing cyclopentadiene at high temperature for a long period of time. Depending on the reaction temperature, dimers, trimers or oligomers can be obtained.

The terpene resins are polymers of terpenes, i.e. hydrocarbons of the formula $C_{10}H_{16}$, which are present in virtually all essential oils or oil-containing resins from plants, and phenol-modified terpene resins. Specific examples of terpenes which may be mentioned are pinene, α-pinene, dipentene, limonene, myrcene, camphene and similar terpenes. The hydrocarbon resins can also be so-called modified hydrocarbon resins. The modification is generally carried out by reaction of the raw materials before the polymerization, by the introduction of specific monomers or by reaction of the polymerized product, in particular by hydrogenation or partial hydrogenation.

Further hydrocarbon resins employed are styrene homopolymers, styrene copolymers, cyclopentadiene homopolymers, cyclopentadiene copolymers and/or terpene polymers having a softening point of in each case above 135° C. (in the case of unsaturated polymers, the hydrogenated product is preferred). Very particular preference is given to the use of cyclopentadiene polymers having a softening point of at least 140° C. or copolymers of α-methylstyrene and vinyltoluene having a softening point of from 120 to 150+ C. in the base layer.

It is furthermore essential to the invention that the base layer, in addition to the resin, comprises a wax having an Mn of from 200 to 700, preferably in an amount of less than 10% by weight, in particular from 1 to 8% by weight, in particular from 1 to 6% by weight, in each case based on the weight of the base layer. For the purposes of the present invention, waxes cover polyethylene waxes and/or macrocrystalline paraffin waxes.

Polyethylene waxes are low-molecular-weight polymers which are essentially built up from ethylene units and are partly or highly crystalline. The polymer chains comprising the ethylene units are elongate molecules, which may be branched, with relatively short side chains predominating. In general, polyethylene waxes are prepared by direct polymerization of ethylene, if desired with use of regulators, or by depolymerization of polyethylenes of relatively high molecular weight. In accordance with the invention, the polyethylene waxes have a mean molecular weight Mn (number average) of from 200 to 700, preferably from 400 to 600, and preferably have a molecular weight distribution (polydispersity) Mw/Mn of less than 2, preferably from 1 to 1.5. The melting point is generally in the range from 70 to 150° C., preferably from 80 to 100 C.

According to general understanding, paraffins cover macrocrystalline paraffins (paraffin waxes) and microcrystalline paraffins (microwaxes). The macrocrystalline paraffins are obtained from vacuum distillate fractions on conversion thereof into lubricating oils. Microcrystalline paraffins originate from the residues of vacuum distillation and the sediments of paraffinic crude oils (deposition paraffins). Macrocrystalline paraffins consist predominantly of n-paraffins which additionally contain isoparaffins, haphthenes and alkylaromatic compounds, depending on the degree of refining. Microcrystalline paraffins consist of a mixture of hydrocarbons which are predominantly solid at room temperature. In contrast to the case in macrocrystalline paraffins, isoparaffins and naphthenic paraffins predominate. Microcrystalline paraffins are distinguished by the presence of crystallization-inhibiting, highly branched isoparaffins and naphthenes. For the purposes of the invention, macrocrystalline paraffins having a melting point of from 60 to 100° C., preferably from 60 to 85° C., are particularly suitable.

It has been found that the combination of wax and resin interacts synergistically and surprisingly further improves, i.e. reduces, the water vapor permeability of oriented polypropylene films if the Mn of the wax is in the range from 200 to 700 and the Mw of the resin is in the range from 600 to 1500. It has been found that waxes having an Mn of above 700 do not interact with resin and do not effect any additional increase in the barrier action to water vapor.

In the same way, it is essential that the Mw of the resin is in the range from 600 to 1500. If an Mw of 1500 is exceeded, the barrier action is impaired compared with films comprising the resin/wax combination according to the invention.

In addition to the resin/wax combination which is essential to the invention, the base layer may contain conventional additives, such as neutralizers, stabilizers, antistatics and/or lubricants, in effective amounts in each case.

Preferred antistatics are alkali metal alkanesulfonates, polyether-modified, i.e., ethoxylated and/or propoxylated polydiorganosiloxanes (polydialkyl-siloxanes, polyalkylphenylsiloxanes and the like) and/or essentially straight-chain and saturated aliphatic, tertiary amines containing an aliphatic radical having 10 to 20 carbon atoms which are substituted by ω-hydroxy-($C_1$–$C_4$)alkyl groups, where N,N-bis(2-hydroxyethyl)alkylamines having 10 to 20 carbon atoms, preferably 12 to 18 carbon atoms, in the alkyl radical are particularly suitable. The effective amount of antistatic is in the range from about 0.05 to 0.5% by weight. Glycerol monostearate is also preferably employed as antistatic, in an amount from 0.03% to 0.5%.

Lubricants are higher aliphatic add amides, higher aliphatic acid esters, waxes and metal soaps, and polydimethylsiloxanes. The effective amount of lubricant is in the range from 0.01 to 3% by weight, preferably from 0.02 to 1% by weight. Particularly suitable is the addition of higher aliphatic acid amides in the range from about 0.01 to 0.25% by weight in the base layer. A particularly suitable aliphatic acid amide is erucamide. The addition of polydimethylsiloxanes is preferred in the range from about 0.02 to 2.0% by weight, in particular polydimethylsiloxanes having a viscosity from 5000 to 1,000,000 $mm^2$/s.

Stabilizers which can be employed are the conventional compounds which have a stabilizing action for polymers of ethylene, propylene and other α-olefins. Their added amount is between 0.05 and 2% by weight. Particularly suitable are phenolic stabilizers, alkali metal or alkaline earth metal stearates and/or alkali metal or alkaline earth metal carbonates. Phenolic stabilizers are preferred in an amount from 0.1 to 0.6% by weight, in particular from 0.15 to 0.3% by weight, and having a molecular weight of greater than about 500 g/mol. Pentaerythrityl tetrakis-3-(3,5-di-tert-butyl-4-hydroxyphenyl)propionate and 1,3,5-trimethyl-2,4,6-tris(3, 5-di-tert-butyl-4-hydroxybenzyl)benzene are particularly advantageous.

Neutralizers are preferably dihydrotalcite, calcium stearate and/or calcium carbonate having a mean particle size of at most 0.7 μm, an absolute particle size of less than 10 μm and a specific surface area of at least 40 $m^2$/g.

The above figures in percent by weight in each case relate to the weight of the base layer.

The polypropylene film according to the invention comprises at least one heat-sealable top layer, in a preferred embodiment on both sides, of polymers of α-olefins having 2 to 10 carbon atoms.

Examples of heat-sealable α-olefinic polymers of this type are
a copolymer of
ethylene and propylene or
ethylene and 1-butylene or
propylene and 1-butylene or
a terpolymer of
ethylene and propylene and 1-butylene or
a mixture of two or more of said homopolymers, copolymers and terpolymers or
a blend of two or more of said homopolymers, copolymers and terpolymers, if desired mixed with one or more of said homopolymers, copolymers and terpolymers,
where particular preference is given to
random ethylene-propylene copolymers having
an ethylene content of from 1 to 10% by weight, preferably from 2.5 to 8% by weight, or
random propylene-1-butylene copolymers having
a butylene content of from 2 to 25% by weight, preferably from 4 to 20% by weight,
in each case based on the total weight of the copolymer, or
random ethylene-propylene-1-butylene terpolymers having
an ethylene content of from 1 to 10% by weight, preferably from 2 to 6% by weight, and
a 1-butylene content of from 2 to 20% by weight, preferably from 4 to 20% by weight,
in each case based on the total weight of the terpolymer, or
a blend of an ethylene-propylene-1-butylene terpolymer and a propylene-1-butylene copolymer
having an ethylene content of from 0.1 to 7% by weight
and a propylene content of from 50 to 90% by weight
and a 1-butylene content of from 10 to 40% by weight,
in each case based on the total weight of the polymer blend.

The above-described copolymers and/or terpolymers employed in the top layer generally have a melt flow index of from 1.5 to 30 g/10 min, preferably from 3 to 15 g/10 min. The melting point is in the range from 120 to 140° C. The above-described blend of copolymers and terpolymers has a melt flow index of from 5 to 9 g/10 min and a melting point of from 120 to 150° C. All the abovementioned melt flow indices are measured at 230° C. and a force of 21:6 N (DIN 53 735).

If desired, all the above-described top layer polymers may have been peroxidically degraded in the same manner as described above for the base layer, basically using the same peroxides. The degradation factor for the top layer polymers is generally in the range from 3 to 15, preferably from 6 to 10.

If desired, the additives described above for the base layer, such as antistatics, neutralizers, lubricants, and/or stabilizers, and, if desired, additionally antiblocking agents, can be added to the top layer(s). The figures in % by weight then relate correspondingly to the weight of the top layer.

Suitable antiblocking agents are inorganic additives, such as silicon dioxide, calcium carbonate, magnesium silicate, aluminum silicate, calcium phosphate and the like, and/or incompatible organic polymers, such as polyamides, polyesters, polycarbonates and the like, preference being given to benzoguanamine-formaldehyde polymers, silicon dioxide and calcium carbonate. The effective amount of antiblocking agent is in the range from 0.1 to 2% by weight, preferably from 0.1 to 0.8% by weight. The mean particle size is between 1 and 6 μm, preferably between 2 and 5 μm, with particles having a spherical shape, as described in EP-A0 236 945 and DE-A-38 01 535, being particularly suitable.

The film according to the invention comprises at least the above-described base layer and a heat-sealable top layer, preferably heat-sealable top layers on both sides.

Preferred embodiments of the polypropylene film have three layers. The structure, thickness and composition of a second top layer can be selected independently of the top layer already present, it being possible for the second top layer likewise to comprise one of the above-described polymers or polymer mixtures, but this need not be identical to that of the first top layer.

The thickness of the outer layer(s) is generally greater than 0.1 µm and is preferably in the range from 0.3 to 3 µm, in particular from 0.4 to 1.5 µm, where top layers on both sides may have identical or different thicknesses.

The overall thickness of the polypropylene film according to the invention can vary within broad limits and depends on the intended use. It is preferably from 4 to 60 µm, in particular from 5 to 30 µm, preferably from 6 to 25 µm, the base layer making up from about 40 to 100% of the total film thickness.

The invention furthermore relates to a process for the production of the polypropylene film according to the invention by the coextrusion process, which is known per se.

This process is carried out by coextruding the melts corresponding to the individual layers of the film through a flat-film die, taking off the resultant film over one or more rolls for solidification, subsequently biaxially stretching (orienting) the film, heat-setting the biaxially stretched film and, if desired, corona- or heat-treating the surface layer intended for the treatment.

The biaxial stretching (orientation) is generally carried out consecutively, with consecutive biaxial stretching, in which stretching is firstly carried out longitudinally (in the machine direction) and then transversely (perpendicular to the machine direction), being preferred.

As is conventional in the coextrusion process, the polymer or polymer mixture of the individual layers is firstly compressed and liquefied in an extruder, it being possible for any additives added already to be present in the polymer or polymer mixture. The melts are then forced simultaneously through a flat-film die (slot die), and the extruded multilayer film is taken off on one or more takeoff rolls, during which it cools and solidifies.

The film obtained in this way is then stretched longitudinally and transversely to the extrusion direction, which results in alignment of the molecule chains. The longitudinal stretching is advantageously carried out with the aid of two rolls running at different speeds corresponding to the desired stretching ratio, and the transverse stretching with the aid of an appropriate tenter frame. The longitudinal stretching ratios are in the range from about 4 to 8, preferably from about 5 to 6. The transverse stretching ratios are in the range from 5 to 10, preferably from 7 to 9.

The biaxial stretching of the film is followed by heat-setting (heat treatment) thereof, in which the film is held at a temperature from 100 to 160° C. for from about 0.1 to 10 seconds. The film is subsequently wound up in a conventional manner by means of a wind-up unit.

It has proven particularly favorable to keep the take-off roll or rolls, by means of which the extruded film is cooled and solidified, at a temperature from 10 to 100° C., preferably from 20 to 50° C., by means of a heating and cooling circuit.

The temperatures at which longitudinal and transverse stretching are carried out can vary in a relatively broad range and depend on the desired properties of the film. In general, the longitudinal stretching is preferably carried out at from 80 to 150° C. and the transverse stretching is preferably carried out at from 120 to 170° C.

After the biaxial stretching, one or both surfaces of the film is/are preferably corona- or flame-treated by one of the known methods. The treatment intensity is generally in the range from 37 to 50 mN/m, preferably from 39 to 4 mN/m.

In the case of corona treatment, an advantageous procedure is to pass the film between two conductor elements serving as electrodes, such a high voltage, usually an alternating voltage (from about 5 to 20 kV and from about 5 to 30 kHz), being applied between the electrodes that spray or corona discharges can occur. The spray or corona discharge ionizes the air above the film surface, which reacts with the molecules of the film surface, causing formation of polar inclusions in the essentially non-polar polymer matrix.

For flame treatment with a polarized flame (see U.S. Pat. No. 4,622,237), a direct electric voltage is applied between a burner (negative pole) and a chill roll. The level of the applied voltage is between 400 and 3000 V, preferably in the range from 500 to 2000 V. The applied voltage gives the ionized atoms increased acceleration, and they hit the polymer surface with greater kinetic energy. The chemical bonds within the polymer molecule are broken more easily, and formation of free radicals proceeds more rapidly. The thermal load on the polymer is much less here than in the case of standard flame treatment, and films can be obtained in which the heat-sealing properties of the treated side are even better than those of the untreated side.

The films according to the invention are distinguished by a significantly improved barrier action against water vapor. Surprisingly, it has been found that the good barrier values achieved by the addition of resin can be further reduced by addition of wax having a selected Mw of from 200 to 700. This makes it possible to offer a film having extraordinary barrier values or to reduce the amount of resin which is conventional in the prior art with comparable barrier values.

The raw materials and films were characterized using the following measurement methods:

Melt flow index

The melt flow index was measured in accordance with DIN 53 735 at a load of 21.6 N and 230° C.

Melting Point

DSC measurement, maximum of the melting curve, heating rate 20° C./min.

Water vapor and oxygen permeability

The water vapor permeability is determined in accordance with DIN 53 122 Part 2.

Surface tension

The surface tension was determined by the ink method (DIN 53 364).

Molecular weight determination Mw

The mean molecular weights Mw and Mn and the mean molecular weight dispersity Mw/Mn were determined in accordance with DIN 55 672, Part 1, by means of gel permeation chromatography. Instead of THF, ortho-dichlorobenzene was used as eluent. Since the olefinic polymers to be investigated are insoluble at room temperature, the entire measurement is carried out at elevated temperature ($\approx$135° C.).

Isotactic Content

The isotactic content of the homopolymer can be characterized to an approximation by means of the insoluble content of the raw material in n-heptane. Usually, a Soxhlet extraction with boiling n-heptane is carried out, it being advantageous to fill the Soxhlet apparatus with a pressed disk instead of granules. The thickness of the pressed disk here should not exceed 500 microns. For quantitative determination of the n-haptane-insoluble content of the homopolymer, it is of crucial importance to ensure a sufficient extraction time of from 8 to 2 hours.

The operational definition of the isotactic content $PP_{iso}$ in percent is given by the ratio of the weights of the dried n-heptane-insoluble fraction to the sample weight:

$PP_{iso}=100\times$(n-heptanen-insoluble fraction/sample weight)

An analysis of the dried n-heptane extract shows that it generally does not consist of pure atactic propylene homopolymer. In the extraction, aliphatic and olefinic oligomers, in particular isotactic oligomers, and also possible additives, such as, for example, hydrogenated hydrocarbon resins and wax, are also included in the measurement.

Chain isotacticity index

The isotactic content $PP_{iso}$ defined above, determined as n-heptane-insoluble content, is not sufficient for characterizing the chain isotacticity of the polymer. It proves appropriate to determine the chain isotacticity index II of the homopolymer by means of high-resolution $^{13}$C-NMR spectroscopy, where the NMR sample to be chosen is not the original raw material, but instead its n-heptane-insoluble fraction. In order to characterize the isotacticity of polymer chains, use is usually made in practice of the $^{13}$C-NMR spectroscopic triad isotacticity index II (triads).

Determination of the triad-related chain isotacticity index II (triads)

The chain isotacticity index II (triads) of the n-heptane-insoluble content of the homopolymer and of the film is determined from their $^{13}$C-NMR spectrum. The intensities of triad signals which result from the methyl groups with different local environments are compared.

With regard to the evaluation of the $^{13}$C-NMR spectrum, a distinction must be made between two cases:

A) The raw material investigated is a propylene homopolymer without a random $C_2$ content.

B) The raw material investigated is a propylene homopolymer having a low random $C_2$ content, referred to below as $C_2$–$C_3$copolymer.

Case A:

The chain isotacticity index of the homopolymer is determined from its $^{13}$C-NMR spectrum. The intensities of signals resulting from the methyl groups with different environments are compared. In the $^{13}$C-NMR spectrum of a homopolymer, essentially three groups of signals, so-called triads, occur.

1. At a chemical shift of from about 21 to 22 ppm, the "mm triad" occurs, which is assigned to the methyl groups having methyl groups directly adjacent on the left and right.
2. At a chemical shift of about 20.2 to 21 ppm, the "mr triad" occurs, which is assigned to the methyl groups having methyl groups directly adjacent on the left or right.
3. At a chemical shift of about 19.3 to 20 ppm, the "rr triad" occurs, which is assigned to the methyl groups without directly adjacent methyl groups.

The intensities of the assigned signal groups are determined as the integral of the signals. The chain isotacticity index is defined as follows:

$$II \text{ triads} = \frac{J_{mm} + 0.5\ J_{mr}}{J_{mm} + J_{mr} + J_{rr}} \cdot 100$$

where $J_{mm}$, $J_{mr}$ and $J_{rr}$ are the integrals of the signal groups assigned.

Case B:

In the $^{13}$C-NMR spectrum of an ethylene-propylene copolymer, the chemical shift of the methyl groups of interest is in the range from 19 to 22 ppm. The spectrum of the methyl groups can be divided into three blocks. In these blocks, the $CH_3$ groups appear in triad sequences, whose assignment to the local environments is explained in detail below:

Block 1:
$CH_3$ groups in the PPP sequence (mm triad)

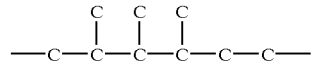

Block 2:
$CH_3$ groups in the PPP sequence (mr or rm triad)

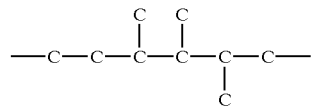

and $CH_3$ groups in the EPP sequence (m chain):

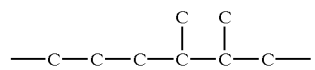

Block 3:
$CH_3$ groups in the PPP sequence (rr triads):

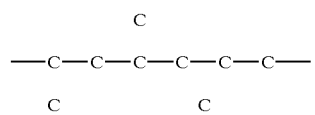

$CH_3$ groups in an EPP sequence (r chain):

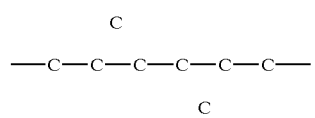

$CH_3$ groups in an EPE sequence:

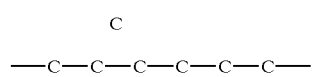

In the determination of the triad-related chain isotacticity index II (triads) of the n-heptane-insoluble content of an ethylene-propylene copolymer, only PPP triads were considered, i.e. only those propylene units which lie between two adjacent propylene units (cf. also EP-B-0 115 940, page 3, lines 48 and 49).

The definition of the triad isotacticity index of an ethylene-propylene copolymer is:

II (triads)=$100\times(J_{mm}/J_{ppp})$

Calculation of the chain isotacticity index of an ethylene-propylene copolymer:

1. $J_{mm}$ is given by the peak integral of block 1.
2. Calculate the integral ($J_{total}$) of all methyl group peaks in blocks 1, 2 and 3.
3. By simple considerations, it is possible to show that $J_{ppp}=J_{total}-J_{EPP}-J_{EPE}$.

Sample preparation and measurement:

60 to 100 mg of polypropylene are weighed into a 10 mm NMR tube, and hexachlorobutadiene and tetrachloroethane in a mixing ratio of about 1.5:1 are added until a fill level of about 45 mm has been reached. The suspension is stored at about 140° C. until (generally after about one hour) a homogeneous solution has formed. In order to accelerate the dissolution process, the sample is stirred from time to time with a glass rod.

The $^{13}$C-NMR spectrum is recorded at elevated temperature (generally 365 K) under standard measurement conditions (semi-quantitative).

References:

W. O. Crain, Jr., A Zambelli, and J. D. Roberts, Macromolecules, 4, 330 (1971)
A. Zambelli, G. Gatti, C. Sacchi, W. O. Crain, Jr., and J. D. Roberts, Macromolecules, 4,475 (1971)
C. J. Carman and C. E. Wilkes, Rubber Chem. Technol. 44, 781 (1971)

EXAMPLE 1

A transparent three-layer film having a symmetrical structure with a total thickness of 20 μm was produced by coextrusion followed by stepwise orientation in the longitudinal and transverse directions. The top layers each had a thickness of 0.6 μm.

| Base layer A: | |
|---|---|
| 86.85% by weight | of highly isotactic propylene homopolymer having a melting point of 166° C. and a melt flow index of 3.4 g/10 min, where the n-heptane-insoluble content had a chain isotacticity index of 98%. |
| 10.0% by weight | of hydrocarbon resin, softening point 120° C., having a mean molecular weight Mw of 1000. |
| 3.0% by weight | of polyethylene wax having a mean molecular weight Mn of 500 and a molecular weight distribution Mw/Mn of 1.08 |
| 0.15% by weight | of N,N-bisethoxyalkylamine (antistatic) |
| Top layers B: | |
| about 75% by weight | of random ethylene-propylene copolymer having a $C_2$ content of 4.5% by weight |
| about 25% by weight | of random ethylene-propylene-butylene terpolymer having an ethylene content of 3% by weight and a butylene content of 7% by weight (remainder propylene) |
| 0.33% by weight | of $SiO_2$ as antiblocking agent, having a mean particle size of 2 μm |
| 0.90% by weight | of polydimethylsiloxane having a viscosity of 30,000 mm$^2$/s |

The production conditions in the individual process steps were as follows:

| Extrusion: | Temperatures | Base layer: | 260° C. |
|---|---|---|---|
| | | Top layers: | 240° C. |
| | Temperature of the take-off roll: | | 20° C. |
| Longitudinal stretching: | Temperature: | | 110° C. |
| | Longitudinal stretching ratio: | | 5.5 |
| Transverse stretching: | Temperature: | | 160° C. |
| | Transverse stretching ratio: | | 9 |
| Setting: | Temperature: | | 140° C. |
| | Convergence: | | 20% |

The transverse stretching ratio $\lambda_r=9$ is an effective value. This effective value is calculated from the final film width W reduced by twice the hem strip width b, divided by the width of the longitudinally stretched film C, likewise reduced by twice the hem strip width b.

EXAMPLE 2

A film was produced as described in Example 1. Instead of the highly isotactic propylene homopolymer, a conventional raw material having a melting point of 165° C. and a melt flow index of 3.5 g/10 min was employed. The chain isotacticity index of the n-heptane-insoluble content of this polypropylene was 94%. The remainder of the composition and the production conditions were unchanged compared with Example 1.

EXAMPLE 3

A film was produced as described in Example 2. In contrast to Example 2, the film now contained 8% by weight of the same hydrocarbon resin in the base layer. The remainder of the composition and the production conditions were unchanged compared with Example 2.

EXAMPLE 4

A film was produced as described in Example 1. In contrast to Example 1, the film now contained 8% by weight of the same hydrocarbon resin in the base layer. The remainder of the composition and the production conditions were unchanged compared with Example 1.

EXAMPLE 5

A film was produced as described in Example 4. In contrast to Example 4, the film now contained 5% by weight of the same polyethylene wax in the base layer. The remainder of the composition and the production conditions were unchanged compared with Example 4.

EXAMPLE 6

A film was produced as described in Example 3. In contrast to Example 3, the film now contained 10% by weight of the same hydrocarbon resin and 5% by weight of the same wax as in Example 3 in the base layer. The remainder of the composition and the production conditions were unchanged compared with Example 3.

EXAMPLE 7

A film was produced as described in Example 3. In contrast to Example 3, the film now contained 5% by weight of the same wax as described in Example 3 in the base layer. The remainder of the composition and the production conditions were unchanged compared with Example 3.

EXAMPLE 8

A film was produced as described in Example 1. In contrast to Example 1, the film now contained 5% by weight of the same wax as described in Example 1 in the base layer. The remainder of the composition and the production conditions were unchanged compared with Example 1.

EXAMPLE 9

A film was produced as described in Example 3. In contrast to Example 3, the film now contained 3% by weight of a macrocrystalline paraffin wax in the base layer. The remainder of the composition and the production conditions were unchanged compared with Example 3.

EXAMPLE 10

A film was produced as described in Example 2. In contrast to Example 2, the film now contained 5% by weight of a macrocrystalline paraffin wax in the base layer. The remainder of the composition and the production conditions were unchanged compared with Example 2.

Comparative Example 1

A film was produced as described in Example 3. In contrast to Example 3, the film now contained no polyethylene wax in the base layer. The remainder of the composition and the production conditions were unchanged compared with Example 3.

Comparative Example 2

A film was produced as described in Example 3. In contrast to Example 3, the film now contained no hydrocarbon resin in the base layer. The remainder of the composition and the production conditions were unchanged compared with Example 3.

Comparative Example 3

A film was produced as described in Example 3. In contrast to Example 3, the film now contained a polyethylene wax having a mean molecular weight Mn of 1000 and a molecular weight distribution Mw/Mn of likewise 1.08 in the base layer. The remainder of the composition and the production conditions were unchanged compared with Example 3.

Comparative Example 4

A film was produced as described in Example 3. In contrast to Example 3, the film now contained a hydrocarbon resin having a mean molecular weight Mw of 2000 in the base layer. The remainder of the composition and the production conditions were unchanged compared with Example 3.

Comparative Example 5

A film was produced as described in Comparative Example 1. In contrast to Comparative Example 1, the film now contained the highly isotactic propylene homopolymer described in Example 1 in the base layer. The remainder of the composition and the production conditions were unchanged compared with Comparative Example 1.

Comparative Example 6

A film was produced as described in Comparative Example 3. In contrast to Comparative Example 3, the film now contained the highly isotactic propylene homopolymer described in Example 1 in the base layer. The remainder of the composition and the production conditions were unchanged compared with Comparative Example 3.

Comparative Example 7

A film was produced as described in Example 2. In contrast to Example 2, the film now contained no polyethylene wax in the base layer. The remainder of the composition and the production conditions were unchanged compared with Example 2.

Comparative Example 8

A film was produced as described in Comparative Example 2. In contrast to Comparative Example 2, the film now also contained no polyethylene wax in the base layer. The remainder of the composition and the production conditions were unchanged compared with Comparative Example 2.

Comparative Example 9

A film was produced as described in Example 9. In contrast to Example 9, the film now contained no resin in the base layer. The reminder of the composition and the production conditions were unchanged compared with Example 9.

Comparative Example 10

A film was produced as described in Example 10. In contrast to Example 10, the film now contained no resin in the base layer. The remainder of the composition and the production conditions were unchanged compared with Example 10.

The water vapor barrier action of the films of the examples and comparative examples are shown in the following table.

TABLE 1

| Example | Standard polypropylene | Highly isotactic polypropylene | Resin content in % by wt. | Wax content in % by wt. | Permeation coefficient in accordance with DIN 53122 at 38° C. and 90% relative humidity g 20 μm/100 in² 24 h | Permeation coefficient in accordance with DIN 53122 at 23° C. and 85% relative humidity g 20 μm/m² 24 h |
|---|---|---|---|---|---|---|
| E1 |  | x | 10 | 3 | 0.14 | 0.45 |
| E2 | x |  | 10 | 3 | 0.17 | 0.56 |
| E3 | x |  | 8 | 3 | 0.19 | 0.62 |
| E4 |  | x | 8 | 3 | 0.16 | 0.53 |
| E5 |  | x | 8 | 5 | 0.13 | 0.46 |
| E6 | x |  | 10 | 5 | 0.12 | 0.42 |
| E7 | x |  | 8 | 5 | 0.15 | 0.52 |
| E8 |  | x | 10 | 5 | 0.10 | 0.35 |
| E9 | x |  | 8 | 3 | 0.18 | 0.61 |
| E10 | x |  | 10 | 5 (Paraffin wax) | 0.37 | 0.11 |

E = example

TABLE 2

| Comparative Examples | Standard polypropylene | Highly isotactic polypropylene | Resin content in % by wt. | Wax content in % by wt. | Permeation coefficient in accordance with DIN 53122 at 38° C. and 90% relative humidity g 20 μm/100 in² 24 h | Permeation coefficient in accordance with DIN 53122 at 23° C. and 85% relative humidity g 20 μm/m² 24 h |
|---|---|---|---|---|---|---|
| CE1 | x | | 8 | | 0.27 | 0.95 |
| CE2 | x | | | 3 | 0.31 | 1.08 |
| CE3 | x | | 8 | 3$_{(Mn1000)}$ | 0.28 | 0.97 |
| CE4 | x | | 8$_{(Mn2000)}$ | 3 | 0.29 | 1.05 |
| CE5 | | x | 8 | | 0.22 | 0.85 |
| CE6 | | x | 8 | 3$_{(Mn1000)}$ | 0.23 | 0.87 |
| CE7 | x | | 10 | | 0.25 | 0.87 |
| CE8 | x | | | | 0.37 | 1.28 |
| CE9 | x | | | 3 | 0.3 | 1.07 |
| CE10 | x | | | 5 | 0.24 | 0.9 |

CE = comparative example

What is claimed is:

1. A multilayer, biaxially oriented polypropylene film comprising a base layer and at least one heat-sealable top layer, wherein said base layer comprises (i) an isotactic propylene polymer and (ii) a combination of a hydrocarbon resin and a wax, said resin having a mean molecular weight MW of from 600 to 1500 and said wax having a mean molecular weight Mn of from 200 to 700.

2. A polypropylene film as claimed in claim 1, wherein a n-heptane-insoluble content of the propylene polymer of the base layer has a chain isotacticity index, measured by means of C-NMR spectroscopy, of at least 95%.

3. A polypropylene film as claimed in claim 1, wherein the propylene polymer has a Mw/Mn selected from the group consisting of 10 and less than 10.

4. A polypropylene film as claimed in claim 1, wherein the propylene polymer of the base layer has been peroxidically degraded or has been prepared by means of a metallocene catalyst.

5. A polypropylene film as claimed in claim 1 wherein said resin is selected from the group consisting of an unhydrogenated styrene polymer, a methylstyrene-styrene copolymer, a pentadiene copolymer, a cyclopentadiene copolymer, an alph-pinene polymer, a beta-pinene polymer, a colophony, colophony derivatives, terpene polymers, hydrogenated compounds of terpene polymers, a hydrogenated alpha-methylstyrene-vinyltoluene copolymer, and mixtures thereof.

6. A polypropylene film as claimed in claim 1, wherein the hydrocarbon resin is present in an amount of from 1 to 15% by weight, based on the weight of the base layer.

7. A polypropylene film as claimed in claim 6, wherein the hydrocarbon resin is present in an amount of from 5 to 12% by weight, based on the weight of the base layer.

8. A polypropylene film as claimed in claim 1, wherein the wax is present in an amount of from 1 to 10% by weight, based on the weight of the base layer.

9. A polypropylene film as claimed in claim 8, wherein the wax is present in an amount of from 1 to 8% by weight, based on the weight of the base layer.

10. A polypropylene film as claimed in claim 8, wherein the wax is present in an amount of from 1 to 16% weight, based on the weight of the base layer.

11. A polypropylene film as claimed in claim 10, wherein said hydrocarbon resin is selected form the group consisting of petroleum resins, styrene resins, cyclopentadiene resins, terpene resins and mixtures thereof.

12. A polypropylene film as claimed in claim 10, wherein said wax is a microcrystalline paraffin having a melting point of from 60° C. to 100° C.

13. A polypropylene film as claimed in claim 1, wherein the wax is a polyethylene wax having an Mw/Mn selected from the group consisting of 2 and less than 2.

14. A polypropylene film as claimed in claim 1, wherein the wax is a macrocrystalline paraffin wax.

15. A polypropylene film as claimed in claim 1, which has a heat-sealable top layer of alpha-olefinic polymers on both sides.

16. A polypropylene film as claimed in claim 15, wherein the polymer of the top layers has been peroxidically degraded and the degradation factor is in the range from 3 to 15.

17. The polypropylene film as claimed in claim 16, wherein the degradation factor is in the range from 6 to 10.

18. A polypropylene film as claimed in claim 15, wherein an interlayer of alpha-olefinic polymers has been applied to one or both sides between the base layer and the top layers.

19. A polypropylene film as claimed in claim 1, wherein the total thickness of the film is from 4 to 60 μm and the base layer makes up from about 40 to 60% of the total thickness.

20. The polypropylene film as claimed in claim 19, wherein the total thickness of the film is from 5 to 30 μm.

21. The polypropylene film as claimed in claim 19, wherein the total thickness of the film is from 6 to 25 μm.

22. A polypropylene film as claimed in claim 1, wherein all layers of the film further comprise neutralizers and stabilizers.

23. A process for the production of a polypropylene film as claimed in claim 1, which comprises performing a orientation in the longitudinal direction with a longitudinal stretching ratio of from 5:1 to 9:1 and in the transverse direction with a transverse stretching ratio of from 5:1 to 10:1.

24. The polypropylene film as claimed in claim 1, wherein the base layer further comprises at least one additive selected from the group consisting of neutralizers, stabilizers, antistatics and lubricants.

25. A polypropylene film as claimed in claim 24, wherein the base layer comprises a tertiary aliphatic amine as an antistatic.

26. The polypropylene film as claimed in claim 1, wherein the top layer further comprises at least one additive selected from the group consisting of neutralizers, stabilizers, antistatics, lubricants and anti-blocking agents.

27. A polypropylene film as claimed in claim 26, wherein the top layer comprises polydimethylsiloxane as a lubricant and $SiO_2$ as an antiblocking agent.

28. A process for the production of oriented polypropylene films having an improved water vapor barrier action, which comprises compressing an isotactic polymer or an isotactic polymer mixture, said polymer or polymer mixture containing a resin having a mean molecular weight Mw of from 600 to 1500 and a wax having a mean molecular weight Mn of from 200 to 700.

29. A packaging film produced by the process of claim 28.

30. A multilayer, biaxially oriented polypropylene film comprising a base layer and at least one heat-sealable top layer, wherein said base layer comprises (i) an isotactic propylene polymer and (ii) a combination of a resin and a wax, wherein said resin being a hydrocarbon resin, fully or partially hydrogenated, having a softening point of 80° C. or above and having a mean molecular weight Mw of from 600 to 1500; and said wax being selected from the group consisting of polyethylene waxes, macrocrystalline paraffin waxes, microcrystalline paraffins and mixtures thereof and having a mean molecular weight Mn of from 200 to 700.

* * * * *